May 12, 1936.   H. E. PRUITT   2,040,709
GRINDING MACHINE
Filed Dec. 1, 1934   3 Sheets-Sheet 1
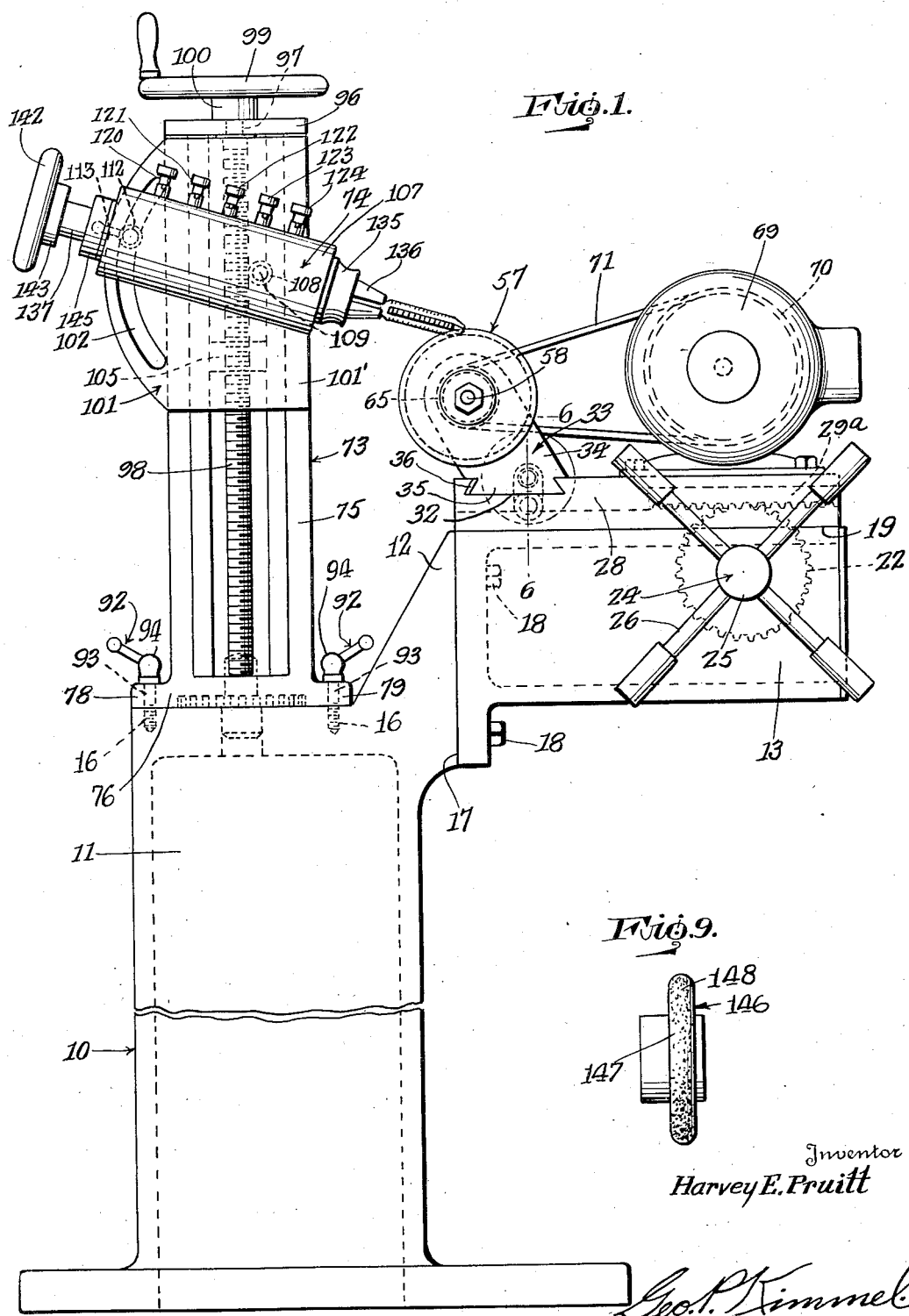
Inventor
Harvey E. Pruitt
Geo. P. Kimmel
Attorney

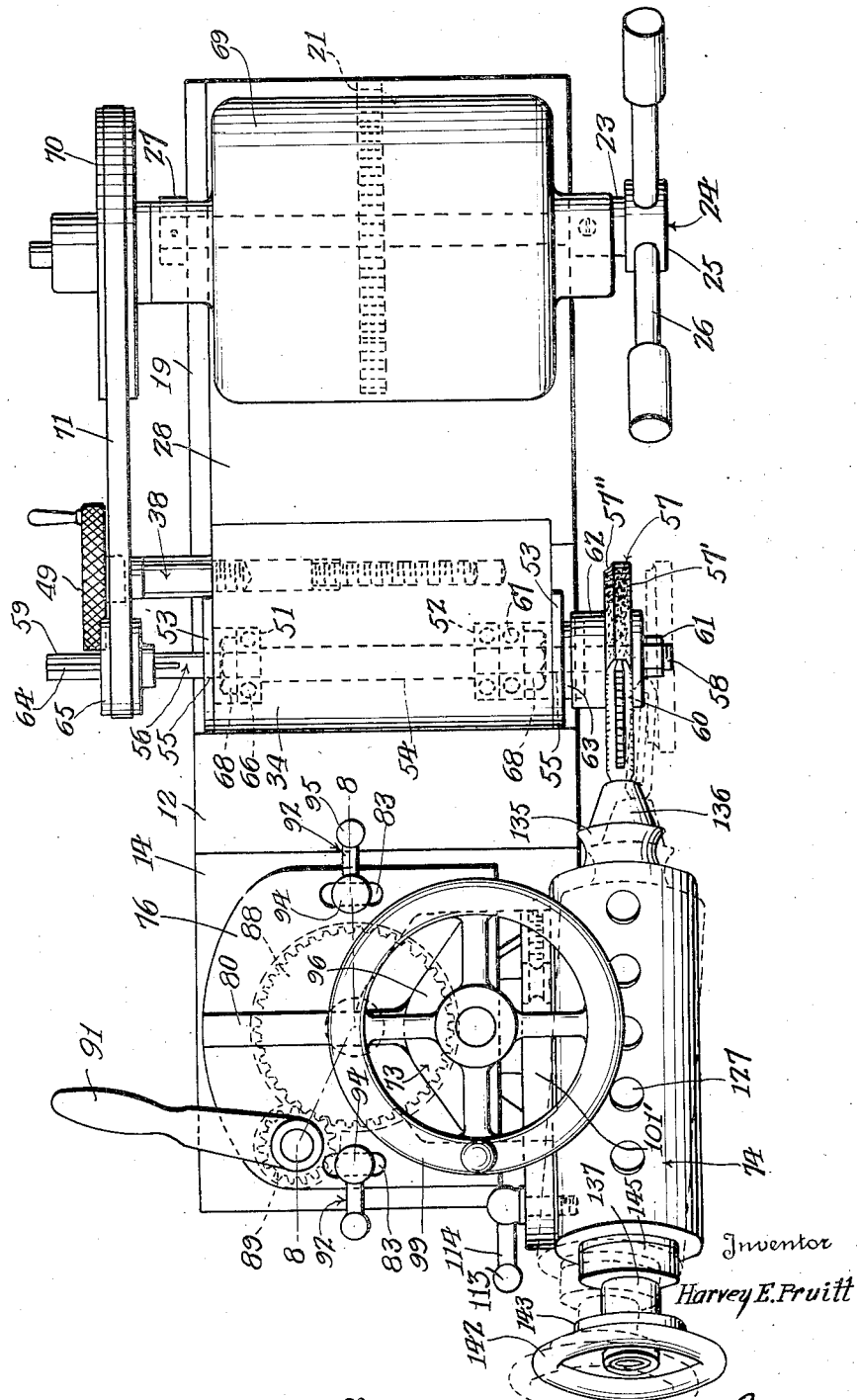

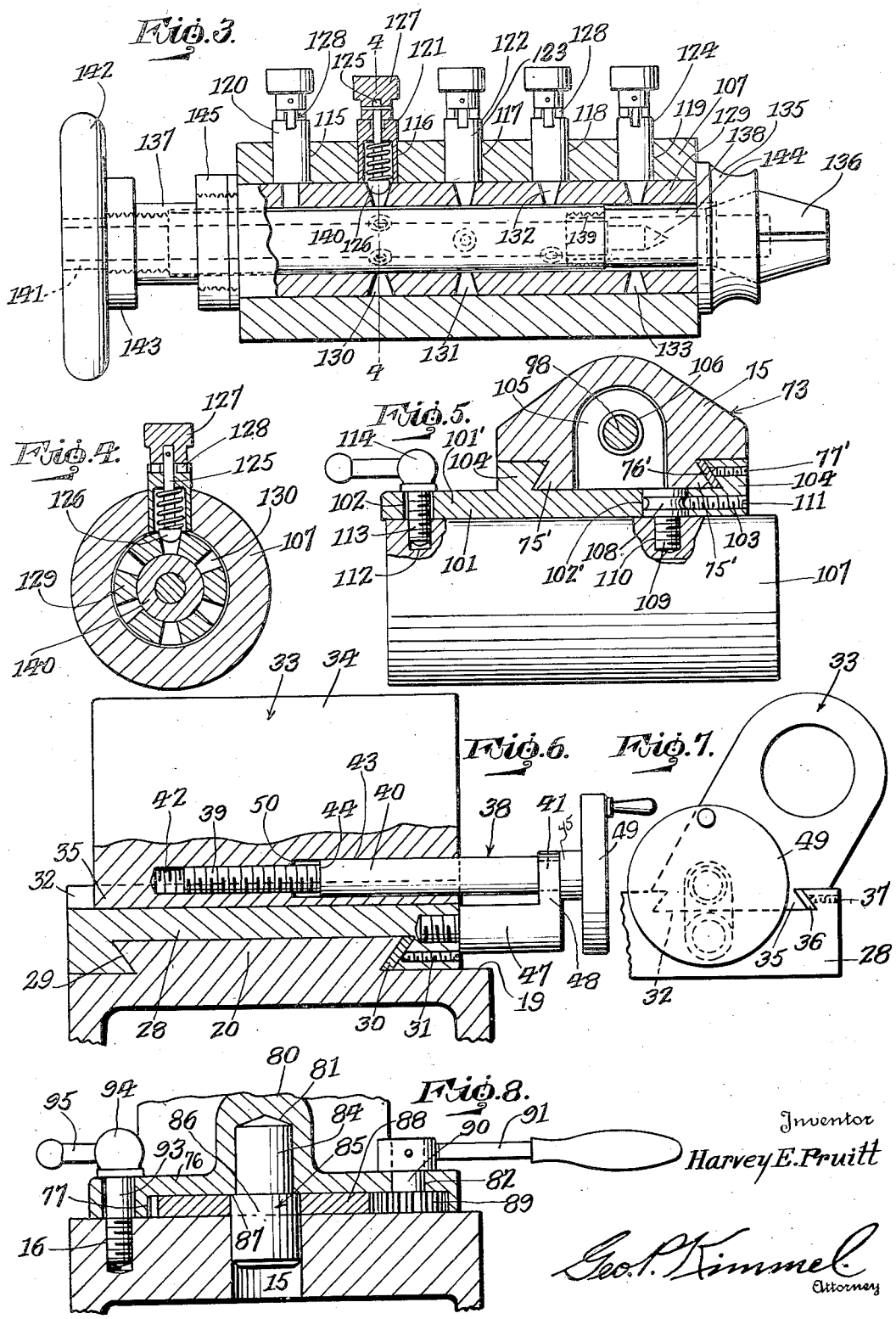

Patented May 12, 1936

2,040,709

UNITED STATES PATENT OFFICE 2,040,709

GRINDING MACHINE

Harvey E. Pruitt, Flint, Mich.

Application December 1, 1934, Serial No. 755,624

3 Claims. (Cl. 51—98)

This invention relates to a grinding machine designed primarily for the grinding of taps, but it is to be understood that the machine is to be employed in any connection for which it may be found applicable.

One of the objects of the invention is to provide, in a manner as hereinafter set forth, a machine of the class referred to to provide the pilot end of the tap with a chamfered portion of arcuate curvature circumferentially and longitudinally with respect to the tap.

A further object of the invention is to provide, in a manner as hereinafter set forth, a machine of the class referred to for expeditiously grinding each flute or land of a tap concentrically with respect to the axis of the latter, whether the tap be new or broken.

A further object of the invention is to provide, in a manner as hereinafter set forth, a machine of the class referred to including a grinding element having a concave corner acting as a grinding surface for producing a chamfered portion disposed upon oppositely extending arcs to provide a clearance at the pilot end of a tap.

A further object of the invention is to provide, in a manner as hereinafter set forth, a machine of the class referred to including coacting means for guiding the lead and clearance for a tap at one operation.

A further object of the invention is to provide, in a manner as hereinafter set forth, a machine of the class referred to having as a part thereof a selectable indexing mechanism for controlling the position of the lands with respect to the flutes whereby the cutting edges of the lands are ground concentrically with respect to the axis of the tap irrespective of the number of lands and flutes.

A further object of the invention is to provide, in a manner as hereinafter set forth, a machine for the purpose referred to including an adjustable centering means for the work to be acted upon.

A further object of the invention is to provide, in a manner as hereinafter set forth, a machine for the purpose referred to for disposing the work to be operated upon at the desired angle with respect to an abrading element.

A further object of the invention is to provide, in a manner as hereinafter set forth, a machine for the purpose set forth with means for bodily shifting an abrading element relative to the work to be operated upon when occasion requires.

A further object of the invention is to provide, in a manner as hereinafter set forth, a machine for the purpose set forth, means for vertically and angularly adjusting the work holder to position the work in the desired position to be satisfactorily operated upon by an abrading element.

Further objects of the invention are to provide, in a manner as hereinafter set forth, a machine for the purpose referred to which is comparatively simple in its construction, strong, durable, compact, conveniently adjusted, thoroughly efficient when used, and comparatively inexpensive to manufacture.

To the above ends essentially, and to others which may hereinafter appear, the invention consists of such parts and such combination of parts which fall within the scope of the invention as claimed.

In the drawings:

Figure 1 is a front elevation of the machine,

Figure 2 is a top plan view of the machine,

Figure 3 is a longitudinal sectional view of an adjustable work holding and indexing structure, Figure 4 is a section on line 4—4, Figure 3, Figure 5 is a detail in horizontal section, Figure 6 is a section on line 6—6, Figure 1.

Figure 7 is a fragmentary view in side elevation of the adjustable holder structure for the abrading element, Figure 8 is a section on line 8—8, Figure 2, and Figure 9 is an elevation of a modified form of abrading element.

The machine includes a supporting structure 10 comprising a pedestal part 11, an upstanding extension part 12 at the upper end of the inner side of part 11 and a horizontally disposed hollow support 13 disposed at right angles to the extension part 12.

The pedestal part 11 has a flat top 14 formed with an opening 15 and a pair of aligning spaced threaded sockets 16. The extension part 12 is disposed at an outwardly inclination to that side of part 11 with which it is formed integral with, and it is provided with a flat vertically disposed outer terminus 17 against which is secured the inner end of support 13 by the holdfast device 18. The arrangement of the pedestal part, extension part and support relative to each other forms the supporting structure 10 of angled contour.

The support 13 has its top 19 provided with a lengthwise extending dove-tail tongue 20 (Figure 6) and a lengthwise extending centrally arranged elongated slot 21 (Figure 2) opening at the inner face of the top 19 and upper face of tongue 20. The slot 21 provides a clearance for a gear wheel 22 carried by a shaft 23, journaled in the sides of support 13 below the top 19. A means for manually operating shaft 23 is designated 24 and which consists of a hub 25 formed with a series of equally spaced radially extending arms 26. The hub 25 is secured to one end of shaft 23 adjacent the outer face of one side of support 13. The other end of shaft 23 carries a stop collar 27.

Mounted upon the top 19 of support 13 is a slide 28 having its lower face formed with a dovetail groove 29 coacting with tongue 20 for connecting slide 28 to support 13. A rack 29a is anchored in the lower face of slide 28 which meshes with wheel 22 whereby on the operation of the latter in opposite directions the slide 28 is moved in a reciprocatory manner lengthwise of the top 19 of support 13. A gib 30 is disposed lengthwise of one side of tongue 20. A binding or retaining screw 31 for gib 30 is carried by slide 28. The gib and screw coact to provide a close sliding fit between the walls of groove 29 and the sides of tongue 20. The slide 28 transversely thereof between its transverse median and inner end is formed with a dove-tail groove 32 for slidably connecting thereon a bodily adjustable carrier 33 for a driven abrading or grinding element. The carrier 33 includes an upstanding block 34 inclining in a direction towards the inner end of slide 28. The lower face of block 34 is formed with a dove-tail tongue 35 which is slidably mounted in and coacts with the walls of groove 32 for adjustably connecting carrier 33 and slide 28 together. The carrier 33 is bodily adjustable transversely of slide 28. A gib 36 is positioned against one side of tongue 35 and a binding or retaining screw 37 is mounted in slide 28, bears against gib 36 and coacts with the latter to provide a close sliding fit between slide 28 and carrier 33. The means for adjusting the latter relative to slide 28 consists of a rotatable adjusting bar 38 (Figure 6) formed of parts 39, 40 and 41. The part 39 is of less diameter than part 40, is peripherally threaded, extends from the inner end of part 40 and threadedly engages with the wall of a socket 42 formed in block 34. The latter is provided with a bore 43 opening at one side of the block. The part 40 is arranged within and extends from bore 43. The socket 41 opens into bore 43 at the inner end of and is of less diameter than that of the bore. The part 41 is of less diameter than part 40. The junction of parts 39, 40 provides a shoulder 44. The part 39 is of less length than part 40 and the latter is of materially greater length than part 41. Anchored to the slide 28, as at 46, is an angle-shaped laterally extending arm 47 formed with a vertically disposed apertured branch 48 at its outer end. The part 41 of bar 38 extends through the branch 48 and carries a hand wheel 49. The latter and shoulder 45 abut branch 48. The junction of socket 42 with bore 43 provides a shoulder 50. On rotating bar 38 the carrier will be adjusted transversely of slide 28. The shoulders 44 and 50 coact for limiting the adjusting of the carrier 33 in one direction, due to the fact that bar 38 does not move transversely with respect to slide 28.

The block 34 (Figure 2) is provided with spaced aligning sockets 51, 52 opening at their outer ends at the sides of the block 34 and closed at their outer end by apertured plates 53 anchored to block 34. The latter is formed in its upper portion with a bore 54 which opens into the sockets 51, 52 and aligns with the apertures 55 in the plates 53. Extending through the bore 54, sockets 51, 52 and apertures 55 is a driven shaft 56 for operating an abrading or grinding element 57 of circular form. The shaft 56 is of a length to extend laterally in opposite directions, with respect to block 34, as at 58, 59. The shaft portion 58 carries the element 57, a retaining disc 60 positioned against the outer face of element 57, a lock nut 61 for disc 60, a retaining collar 62 positioned against the inner face of element 57 and a spacing means 63 between a plate 53 and collar 62. The abrading or grinding element 57 is in the form of an apertured disc 57' of the desired diameter and thickness having the inner part of its outer edge cut away to provide a concave working surface 57'' circumferentially thereof, acting to provide a chamfer on the outer end of the lands of a tap. The curvature of the chamfer being arcuate in transverse and longitudinal directions thereof. The shaft portion 59 is provided with a key 64 for slidably connecting the shaft 56 to its driving pulley 65. Within the sockets 51, 52 are bearings 66, 67 respectively for shaft 56. These bearings are retained in said sockets by holding nuts 68 positioned thereagainst and threadedly engaging with shaft 56. The bearings are arranged against the walls of the sockets. The nuts 68 are of less diameter than that of the bearings.

Secured upon slide 28 and bodily moving therewith is a driving motor 69 for the pulley 65. The motor shaft carries a pulley 70 for operating a transmission belt 71 leading to pulley 65 to drive the latter.

The machine includes an upstanding horizontally adjustable suspending structure 73 for an angularly adjustable combined work holder and indexing structure 74. The structure 73 includes means to be presently referred to for vertically adjusting the structure 74.

With reference to Figures 1, 2, 5 and 8. The structure 73 includes an upstanding hollow body part 75 open at its upper end. The body part 75 includes a rearwardly extended base plate 76 for closing its lower end. The base plate 76 seats upon the top 14 of pedestal part 11 and is cut out on its inner face rearwardly of body part 75 to form a chamber 77 (Figure 8). The base plate 76 extends laterally in opposite directions with respect to the the body part 75, as at 78, 79. The upper face of base plate 76 rearwardly of body part 75 has an upstanding rib 80 formed with a socket 81 opening into chamber 77. The base plate 76 is also provided with an opening 82 (Figure 8) which communicates with chamber 77 adjacent one side of socket 81. The side wall of chamber 77 is arranged inwardly adjacent to the side, front and rear edges of the base plate 76. The latter between its side edges and the wall of chamber 77 is formed with a pair of spaced parallel slots 83 which register with the sockets 16 (Figure 8). Fixed to the wall of socket 81 in base plate 76 is the reduced upper end portion 84 of a vertical stub shaft 85. The latter has its lower end portion 86 revolubly arranged in the opening 15 (Figure 8). The shaft 85 is formed with a shoulder 87 which abuts the top wall of chamber 77. Fixed to the lower end portion 86 of shaft 85 and rotatable in chamber 77 is a gear wheel 88 adapted when rotated to shift the structure 73 horizontally on and at an angle with respect to the top 14 of pedestal part 11. The means for rotating the gear wheel 88 consists of a pinion 89 carried on the lower end of a vertically disposed stub shaft 90 extending upwardly through opening 82. Attached to the upper end of shaft 90 is a handle member 91 arranged over base plate 76 and which is employed for shifting shaft 90. The pinion 89 meshes with gear wheel 88. The base plate 76 is normally locked stationary upon pedestal part 11, and for such purpose a pair of like locking members 92 are employed. Each of these members 92 is formed of a threaded bolt 93 having an enlarged head 94 provided with a handle 95. The bolts 93 extend down through the slots 83 and threadedly engage with the walls of sockets 16 (Figure 8). The heads 94 of members 92 are adapted to bind against the upper face of base plate 76 whereby, in connection with the bolts 93, when these latter are screwed home, the structure 73 will be held stationary upon the top of pedestal part 11. When it is desired to angularly adjust structure 73 with respect to the top of pedestal part 11, the bolts 93 are loosened and gear 88 rotatable, as at the shaft 85, is fixedly secured to base plate 76, the structure 73 will be shifted relative to pedestal part 11 when wheel 88 is rotated. When adjusting structure 73, it is not required to entirely remove the bolts 92 as the slots 83 offer the necessary clearance for adjusting structure 73 in opposite directions.

Mounted on top of body part 76 is a closure plate 96 therefor formed with an opening 97 for the passage of a vertically disposed rotatable screw rod 98 employed for elevating and lowering the structure 74. The rod 98 is suitably connected to plate 76 so as to cause the vertical movement of said structure 74. The rod 98, at its upper end, is provided with a turning wheel 99 therefor spaced, as at 100, from plate 96.

With reference to Figures 1, 2, 3, 4 and 5. The structure 74 includes a carrier 101 in the form of a vertical plate 101' having an upstanding arcuate slot 102 in proximity to one side edge thereof. The plate 101', at a point between its vertical median and its other side edge is formed with an opening 102' positioned on the transverse median of the plate. The latter is formed with a threaded bore 103 communicating with and leading from opening 102' to the said other side edge of the plate. The rear face of plate 101' is formed with a pair of spaced oppositely disposed flanges 104 lengthwise thereof. The inner side faces of flanges 104 are oppositely beveled. The flanges 104 coact to form the rear of plate 101' with a dove-tail groove. Integral with the inner face of plate 101 between and spaced from the flanges 104 is an extension or boss 105. The latter extends into the body part 75 of the structure 73 from the front of the latter and is formed with a vertically disposed threaded opening 106 for the passage of screw 98 which threadedly engages with the wall of opening 106. The front of body part 75 of structure 73 is formed with spaced vertically extending parallel flanges 75' having oppositely disposed beveled outer side faces. The flanges 75' are positioned in the groove formed by and coact with the flanges 104 for slidably connecting the carrier 101 on the front of the body part 75 of structure 73. A gib 76' is arranged against the inner side face of a flange 104, the latter carries a retaining screw 77' for the gib 76'. The employment of gib 76' in connection with screw 77' provides for a close sliding fit between the flanges 75' with respect to flanges 104.

The structure 74 also includes a cylinder 107 open at each end. The cylinder is pivotally suspended from plate 101', and for such purpose there is arranged in opening 102' the circumferentially grooved head 108 of a pivot member 109 having threaded engagement with the wall of a socket 110 opening at the outer periphery of cylinder 107. Engaging with the wall of bore 103 is a threaded retainer 111 which extends into the groove of head 108. The cylinder 107 is formed with a threaded socket 112 which aligns with slot 102. The cylinder 107 is angularly adjustable on head 108 relative to plate 101'. The cylinder 107 is held in its adjusted position by an angle shaped locking member 113 which extends through slot 102 and threadedly engages with the wall of socket 112. The member 113 includes a large head 114 which binds against the plate 101' (Figure 5) when the member 113 is screwed home whereby the cylinder 107 is held in its adjusted position relative to plate 101'. The wall of cylinder 107 is formed with a row of spaced aligning openings 115, 116, 117, 118 and 119. Fixed in and extending from said openings are spring controlled latching devices 120, 121, 122, 123 and 124. Each latching device includes a rotatable spring controlled plunger 125 having an enlargement 126 at its inner end and a head 127 at its outer end. Each latching device includes means, as at 128, for maintaining the plunger thereof retracted. Arranged within the cylinder 107 is a rotatable tubular holder 129 forming the body part of a collet retainer and having spaced sets of spaced sockets 130, 131, 132, and 133. The number of sockets of the set 130 is six, that of set 131 four, that of set 132 three and that of set 133 two. The locking devices 121, 122, 123, 124 coact with the sockets of the sets 130, 131, 132 and 133 for latching holder 129 in its adjusted position. The enlargements on the inner ends of the plungers of the latching devices 121, 122, 123 and 124 selectively coact with the sockets of the sets 130, 131, 132 and 133. The locking devices 121, 122, 123 and 124, sets of sockets and holder 129 are employed for indexing the lands of the tap. The holder 129 has an opening 134 which coacts with the enlargement 124 of the plunger 125 of the locking device 120 for retaining the holder or collet retainer 129 in its initial position prior to adjustment thereof.

The holder 129 has secured to one end thereof an interiorly beveled annulus 135 forming the head of the collet retainer and through which extends a collet 136. The head 135 of the collet retainer is of greater diameter than the holder 129 and bears against one end of cylinder 107. The other end of the holder 129 is formed with a reduced peripherally threaded tubular extension 137. The stem of collet 136 is indicated at 138. The stem is tubular and is formed with peripherally threaded reduced inner portion 139. Extending into the holder 129 from the extension 137 is a tubular pull bar 140 having internal threads at its forward end for engaging the peripheral threads on the reduced inner portion 139 of stem 138 whereby the pull bar 140 and collet 136 are connected together. The function of pull bar 140 is to draw the collet 136 rearwardly to provide for head 135 of the collet retainer acting on the outer end of the collet to clamp the work to the latter. The pull bar 140 has a reduced rear end 141 for connection to a hand wheel 142. The pull bar 140, immediately adjacent the wheel 142 is formed with peripheral threads with which engages an adjusting nut 143 for the bar. The nut 143 is detachably secured from rotation. Carried by the forward end of the pull bar 140 is a work centering element 144 which extends into the stem of the collet. The nut 143 acts upon the pull bar 140 for shifting the latter relatively to the shank of the collet for adjusting the position of the element 144 lengthwise with respect to the collet stem.

Threadedly engaging with the extension 137 of holder 129 is removable locking means 145 which, when locked in position, abuts the cylinder 107 and in connection with the head 135 of the collet retainer prevents the shifting of the latter lengthwise relative to cylinder 107. After the nut 143 has been operated to adjust the position of element 144 it is secured in abutting relation against the rear end of extension 137 which prevents the shifting of pull bar 140 relative to the collet retainer.

When the holder 129 is free of the latching devices, the collet retainer, collet, work and pull bar are bodily revolved together the desired extent within cylinder 107 when occasion requires to properly position the work relative to the grinding element. This can be accomplished when the locking means 145 is loosened.

The abrading element shown in Figure 9, indicated at 146, is in the form of a circular disc 147 having a convex edge 148.

With respect to the operation of the machine. The tap to be ground is extended into and locked to the collet which forms an element of the combined work holder and indexing structure 74 bodily carried by the suspending structure 73. The structure 74 is adjustable vertically and at an angle relative to the structure 73. After the tap has been locked to structure 74, the structure 73 is then angularly shifted horizontally upon and with respect to the top of the supporting structure 10 to about from five to seven degrees so as to position structure 73 off-center with respect to the grinding element 57. After the adjustment of structure 73 to the desired point, it is clamped solid upon the top of structure 10 and structure 74 is then adjusted at an angle relative to structure 73 for the purpose of obtaining the desired lean on the tap. After the structure 74 has been angularly adjusted relative to structure 73 it is locked in its adjusted position. The grinding element 57 is then arranged so that the point of the tap is directly over the concave working edge of said element. The tap is now set for grinding clearance. The screw 98 is now revolved in a direction to provide for the lowering of carrier 101 to an extent whereby the tap will contact with element 57. The slide 28 is then reciprocated in a direction towards and from the tap to cause element 57 to travel directly under the tap and act on the latter. After one flute of the tap has been acted upon, the other flutes thereof will be successively indexed by structure 74 and successively acted upon by the element 57. After a grinding action has been completed on a flute, the carriage 101 is elevated, the tap turned, the follower flute indexed and the carriage 101 lowered to position the indexed flute for grinding action thereon by element 57.

What I claim is:

1. In a grinding machine, a support, a suspension structure mounted thereon and formed with spaced parallel slots at its bottom, a gear interposed between said support and said structure, a pinion meshing with said gear and positioned at the bottom of said structure, a shaft for the gear revolubly mounted in said support and fixed to said structure, means for revolving the pinion to provide for the angularly adjusting of said structure relative to said support, releasable means extending through said slots and engaging in the support for locking the structure in its adjusted position, a structure vertically movable relative to and bodily carried with the suspension structure provided with a combined work holding and indexing mechanism capable of being angularly adjusted on a horizontal axis, a grinding element, and means for operating, supporting and moving said element towards and from the work held by said mechanism.

2. In a grinding machine, a grinding element structure arranged in juxtaposition to the work to be acted upon and comprising a rectangular hollow supporting means having a dovetail tongue on its top and a slot at the lengthwise center of the tongue, said tongue disposed lengthwise of, substantially of the same length as and having its sides spaced inwardly adjacent to the side edges of the top, a slide seated on said tongue and riding on the side marginal portions of said top, said slide being provided at its lengthwise center with a rack opposing said slot, a rotatable shaft extending transversely through said supporting means and provided intermediate its ends with a gear engaging with the rack for reciprocating the slide; an upstanding support disposed transversely of the inner end portion of, seated in and slidably connected to the slide and disposed at an inclination towards the work, a grinder element, an operating shaft for said element, said shaft being carried by and extending from said support and carrying, at one end, said element and positioning the latter adjacent to one side of said supporting means, means carried by said support and slide for adjusting the support transversely with respect to the slide, a motor bodily carried with the slide, and an operative drive connection leading from the motor to the other end of and for said shaft, said drive connection being slidably connected to the said other end of the shaft.

3. In a grinding machine, a combined work indexing and holding mechanism, a vertically movable and horizontally revolvable carrier, an upstanding horizontally revolvable support for and having means for connecting the carrier thereto and for vertically moving the latter, said mechanism being disposed transversely of the carrier, an outwardly directed horizontally disposed pivot revolvably connected within the carrier and fixed to said mechanism to provide for the angularly adjusting of said mechanism relative to and independently with respect to the carrier and said support, a stationary supporting means for said support, means interposed between said supporting means and support, connected to the latter and in engaging in said supporting means for revolving the support horizontally upon said supporting means, spaced means carried by the bottom of the support and releasably engaging in the top of said supporting means for locking said support from movement relative to the supporting means, and said mechanism and carrier having coacting parts for securing the mechanism in adjusted relation with respect to the carrier and support and to provide for said mechanism and carrier vertically moving together relative to said support and said carrier and mechanism bodily moving together with said support on the horizontal revolving of the latter.

HARVEY E. PRUITT.